(12) United States Patent
Tanaka et al.

(10) Patent No.: US 9,242,631 B2
(45) Date of Patent: Jan. 26, 2016

(54) VEHICLE AND CONTROL METHOD FOR VEHICLE

(71) Applicants: Nobuyuki Tanaka, Toyota (JP); Masahiro Naito, Aichi-ken (JP)

(72) Inventors: Nobuyuki Tanaka, Toyota (JP); Masahiro Naito, Aichi-ken (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 103 days.

(21) Appl. No.: 13/856,939

(22) Filed: Apr. 4, 2013

(65) Prior Publication Data

US 2013/0288857 A1 Oct. 31, 2013

(30) Foreign Application Priority Data

Apr. 25, 2012 (JP) .................................. 2012-099584

(51) Int. Cl.

| B60W 10/08 | (2006.01) |
| B60W 10/04 | (2006.01) |
| B60W 10/10 | (2012.01) |
| B60K 6/445 | (2007.10) |
| B60W 10/105 | (2012.01) |
| B60W 30/18 | (2012.01) |

(52) U.S. Cl.
CPC ................ *B60W 10/04* (2013.01); *B60K 6/445* (2013.01); *B60W 10/08* (2013.01); *B60W 10/10* (2013.01); *B60W 10/105* (2013.01); *B60W 30/18072* (2013.01); *B60W 2030/1809* (2013.01); *B60W 2710/105* (2013.01); *Y02T 10/6239* (2013.01); *Y10T 477/68* (2015.01)

(58) Field of Classification Search
USPC ....................................................... 477/118
See application file for complete search history.

(56) References Cited

U.S. PATENT DOCUMENTS

| 4,192,279 | A | 3/1980 | Maisch et al. |
| 5,514,049 | A | 5/1996 | Kamio et al. |
| 8,548,642 | B2 | 10/2013 | Handa |
| 8,591,381 | B2 | 11/2013 | Zhang et al. |
| 8,712,672 | B2 | 4/2014 | Hayashi et al. |
| 2003/0197385 | A1 | 10/2003 | Onoyama et al. |

(Continued)

FOREIGN PATENT DOCUMENTS

| JP | 2001-090830 A | 4/2001 |
| JP | 2001-191814 A | 7/2001 |

(Continued)

OTHER PUBLICATIONS

U.S. Office Action dated Nov. 20, 2014 issued to U.S. Appl. No. 13/856,926.

(Continued)

*Primary Examiner* — Justin Holmes
*Assistant Examiner* — Lillian Nguyen
(74) *Attorney, Agent, or Firm* — Dinsmore & Shohl LLP

(57) ABSTRACT

A control method for a vehicle, which is equipped with a drive unit configured to drive a driving wheel and a controller configured to control the drive unit and receive an activation command for the drive unit from a user, includes determining whether the vehicle carries out coasting with the drive unit unactivated, determining whether the activation command has been received during the coasting, and limiting an actual braking force generated by the drive unit if the controller has received the activation command during the coasting, compared to a case where the vehicle runs in a state other than the coasting.

10 Claims, 6 Drawing Sheets

(56) References Cited

U.S. PATENT DOCUMENTS

| | | |
|---|---|---|
| 2010/0006358 A1 | 1/2010 | Ishikawa |
| 2010/0030412 A1 | 2/2010 | Mitsutani |
| 2013/0109531 A1* | 5/2013 | Hoshiba .................. 477/52 |
| 2013/0179018 A1 | 7/2013 | Yamamoto et al. |
| 2013/0253806 A1 | 9/2013 | Ueno |
| 2013/0288857 A1 | 10/2013 | Tanaka et al. |
| 2013/0289814 A1* | 10/2013 | Tanaka et al. ............... 701/22 |
| 2014/0107902 A1 | 4/2014 | Shiono |
| 2014/0277891 A1 | 9/2014 | Hoshiba |
| 2014/0277982 A1 | 9/2014 | Schenkermayr |

FOREIGN PATENT DOCUMENTS

| | | | |
|---|---|---|---|
| JP | 2002-364403 A | | 12/2002 |
| JP | 2004-092623 A | | 3/2004 |
| JP | 2008-179232 A | | 8/2008 |
| JP | 2008-232110 A | | 10/2008 |
| JP | 2010-018174 A | | 1/2010 |
| JP | 2011111915 A | * | 6/2011 |
| JP | 2011-183822 A | | 9/2011 |
| JP | 2011-239605 A | | 11/2011 |
| JP | 2011239605 A | * | 11/2011 |
| WO | 2013/061452 A1 | | 5/2013 |

OTHER PUBLICATIONS

Notice of Allowance issued to U.S. Appl. No. 13/856,926 on Jun. 17, 2015.

* cited by examiner

VEHICLE AND CONTROL METHOD FOR VEHICLE

INCORPORATION BY REFERENCE

The disclosure of Japanese Patent Application No. 2012-099584 filed on Apr. 25, 2012 including the specification, drawings and abstract is incorporated herein by reference in its entirety.

BACKGROUND OF THE INVENTION

1. Field of the Invention

The invention relates to a vehicle and a control method for the vehicle, and more specifically, to activation control of a vehicle in the case where a drive unit is activated during coasting.

2. Description of Related Art

In the case where a user erroneously turns off a power supply of a control system of a vehicle through operation during traveling of the vehicle, a drive unit including an internal combustion engine and a rotating electrical machine may be stopped, and the vehicle may coast with the generation of a driving force stopped.

In the case where the vehicle coasts in this manner, it may become necessary to reactivate the drive unit to cause the vehicle to travel appropriately.

Japanese Patent Application Publication No. 2004-092623 (JP-2004-092623 A) discloses an art of allowing an engine to be reactivated by temporarily changing over the shifting range to a neutral range through coercion or limiting the opening degree of a throttle even in the case where the range of an automatic transmission is set to a drive range, if the engine is stopped during traveling of a vehicle.

In a vehicle that generates a driving force for running by a rotating electrical machine, such as a hybrid vehicle or an electric vehicle, if an accelerator pedal is turned off during running, a braking force resulting from the regenerative operation of the rotating electrical machine is applied, and the vehicle thereby decelerates.

However, if coasting as described above is started, the switching operation of an inverter that drives the rotating electrical machine is stopped. Therefore, there is established a so-called free-run state where no braking force is generated by the rotating electrical machine and only an inertial force of the vehicle is applied.

If the switching operation of the inverter is resumed through the activation operation by the user during this coasting, the braking force generated by the rotating electrical machine recovers.

In addition, the magnitude of the braking force of the rotating electrical machine changes in accordance with the set speed ratio. Therefore, if a low speed-side speed ratio is selected, a larger deceleration can be generated.

SUMMARY OF THE INVENTION

The invention provides a vehicle and a control method for the vehicle that restrains the braking force of the vehicle from changing if a drive unit is activated during coasting of the vehicle.

A vehicle according to a first aspect of the invention is equipped with a drive unit configured to drive a driving wheel, and a controller configured to control the drive unit and receive an activation command for the drive unit from a user. The controller limiting an actual braking force generated by the drive unit if a condition i) that the vehicle carry out coasting with the drive unit unactivated and a condition ii) that the activation command for the drive unit is received from the user are fulfilled, compared to a case where the vehicle runs in a state other than coasting.

In the vehicle, the controller may gently increase the actual braking force if the controller has received the activation command during the coasting, compared to a case where the vehicle runs in a state other than the coasting.

The vehicle may be equipped with a gear shifter configured to be capable of changing a speed ratio between the drive unit and the driving wheel. The gear shifter may select one of a plurality of predetermined shift ranges on the basis of an operation by the user. The controller may control the drive unit such that no braking force is generated in a case where the selected shift range is different in orientation from a vehicle speed, if the controller has received the activation command during the coasting.

The vehicle may be equipped with a gear shifter configured to be capable of changing a speed ratio between the drive unit and the driving wheel. The gear shifter may select one of a plurality of predetermined shift ranges on the basis of an operation by the user. The controller may change a degree of increase in the actual braking force in accordance with the selected shift range, if the controller has received the activation command during the coasting.

In the vehicle, the controller may set, in a case where there are a plurality of speed ratios settable in the selected shift range, a speed ratio to one of the plurality of the settable speed ratios which makes the actual braking force small, if the controller has received the activation command during the coasting.

In the vehicle, the controller may lift the limit on the actual braking force after the actual braking force has reached a braking force corresponding to a speed ratio formed by the gear shifter.

The vehicle may be equipped with a gear shifter configured to be capable of changing a speed ratio between the drive unit and the driving wheel. The gear shifter may select one of a plurality of predetermined shift ranges on the basis of an operation by the user. The controller may lift the limit on the actual braking force if an operation of making a change in shift range is performed while the actual braking force is limited.

In the vehicle, the drive unit may include at least one of an internal combustion engine and a rotating electrical machine. A control method for a vehicle according to a second aspect of the invention is a control method for a vehicle including a drive unit configured to drive a driving wheel, and a controller configured to control the drive unit and receive an activation command for the drive unit from a user. The control method includes determining whether the vehicle carries out coasting with the drive unit unactivated, determining whether the activation command has been received during the coasting, and limiting an actual braking force generated by the drive unit, if the controller has received the activation command during the coasting, compared to a case where the vehicle runs in a state other than the coasting.

According to each of the first and second aspects of the invention, the braking force of the vehicle can be restrained from changing if the drive unit is activated during coasting of the vehicle.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
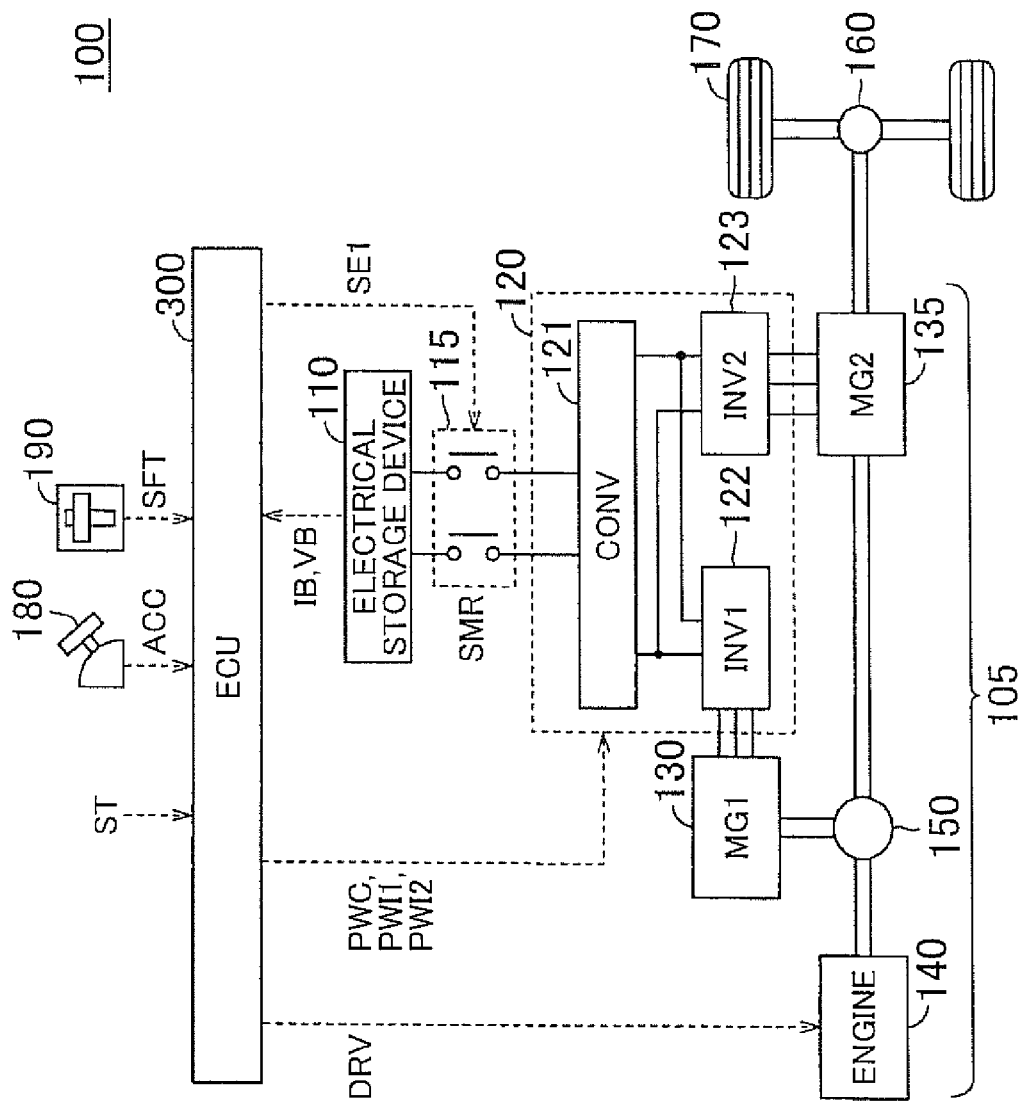
FIG. 1 is an overall block diagram of a vehicle according to this embodiment of the invention.

The embodiment of the invention will be described hereinafter in detail with reference to the drawings. Incidentally, identical or equivalent components in the drawings are denoted by the same reference symbols respectively, and the description thereof is not repeated.

FIG. 1 is an overall block diagram of a vehicle 100 according to this embodiment of the invention. Referring to FIG. 1, the vehicle 100 is equipped with a drive unit 105, an electrical storage device 110, a system main relay (an SMR) 115, a power control unit (a PCU) 120, a speed reducer 160, driving wheels 170, an accelerator pedal 180, a shift lever 190, and an electronic control unit (an ECU) 300 as a control unit. The drive unit 105 includes a motor-generator 130 (MG1), a motor-generator 135 (MG2), an engine 140 as an internal combustion engine, and a motive power split mechanism 150. Besides, the PCU 120 includes a converter 121, an inverter 122 (INV1), and an inverter 123 (INV2).

The electrical storage device 110 is chargeably/dischargeably configured as an electric power storage element. The electrical storage device 110 is configured to include, for example, a secondary battery such as a lithium-ion battery, a nickel hydride battery, a lead storage battery or the like, or an electrical storage element such as an electric double-layer capacitor or the like.

The electrical storage device 110 is connected to the converter 121 in the PCU 120. In addition, the electrical storage device 110 supplies the PCU 120 with an electric power for generating a driving force of the vehicle 100. Besides, the electrical storage device 110 stores an electric power generated by the motor-generators 130 and 135. The output of the electrical storage device 110 is equal to, for example, about 200 V.

The SMR 115 is provided in an electric power transmission path from the electrical storage device 110 to the PCU 120. In addition, the SMR 115 makes a changeover between the supply and shutoff of electric power between the electrical storage device 110 and the PCU 120, on the basis of a control signal SE1 from the ECU 300.

The converter 121 steps up a voltage from the electrical storage device 110 on the basis of a control signal PWC from the ECU 300, and supplies the stepped-up voltage to the inverters 122 and 123. Besides, the converter 121 steps down a voltage generated by the motor-generators 130 and 135 and rectified by the inverters 122 and 123, and charges the electrical storage device 110.

The inverters 122 and 123 are connected in parallel with each other to the converter 121. The inverters 122 and 123 convert a direct-current electric power supplied from the converter 121 into an alternating-current electric power on the basis of control signals PWI1 and PWI2 from the ECU 300 respectively, and drive the motor-generators 130 and 135 respectively.

Each of the motor-generators 130 and 135 is an alternating-current rotating electrical machine, for example, a permanent magnet synchronous electric motor that is equipped with a rotor in which a permanent magnet is embedded.

The motor-generators 130 and 135 and the engine 140 are coupled to one another by the motive power split mechanism 150. The motive power split mechanism 150 includes a planetary gear mechanism (not shown). For example, the motor-generator 130 is coupled to a sun gear of the planetary gear mechanism, the engine 140 is coupled to a planetary carrier of the planetary gear mechanism, and the motor-generator 135 is coupled to a ring gear of the planetary gear mechanism. By realizing this coupling state, the motive power split mechanism 150 functions as a continuously variable transmission as well. Incidentally, although not shown in FIG. 1, an additional transmission may be provided in the drive unit 105.

The engine 140 is controlled by the ECU 300 through the use of a control signal DRV. The motor-generators 130 and 135 and the engine 140 are cooperatively operated by the ECU 300, and generate a driving force required of the vehicle 100. Incidentally, the vehicle 100 can also carry out so-called EV running, namely, running through the use of only a driving force from the motor-generators 130 and 135 with the engine 140 stopped.

The accelerator pedal 180 is operated by a user, and an operation amount of the accelerator pedal 180 (hereinafter referred to also as "an accelerator opening degree") is output to the ECU 300. Basically, the ECU 300 controls the driving force generated by the drive unit 105, on the basis of the accelerator opening degree ACC.

A shift lever 190 is a component for allowing the user to set a shift range of the vehicle. The shift lever 190 outputs to the ECU 300 information on a shift position SFT that is set through the operation by the user. The ECU 300 sets a shift range corresponding to the shift position SFT from the shift lever 190.

Examples of the shift range include a B range, an S range, and a D range as drive ranges (traveling ranges), an R range as a reverse range, a P range as a parking range, an N range as a neutral range and the like. The combination of usable speed ratios differs depending on the selected drive range. Besides, specific speed ratios can be set in the S range. For example, in the case where six speed ratios are provided, six ranges S1 to S6 are set in such a manner as to correspond to the first to sixth speeds respectively.

In addition, the ECU 300 controls the motor-generators 130 and 135 and the engine 140 such that an appropriate speed ratio is obtained in each of the shift ranges, on the basis of a user required power based on an operation amount of the accelerator pedal 180, a vehicle speed, and the like.

The ECU 300 includes a central processing unit (a CPU), a storage unit, and input/output buffers although all these components are not shown in FIG. 1. Signals are input to the ECU 300 from respective sensors and the like. Also, the ECU 300 outputs control signals to respective components, and controls the vehicle 100 and the respective components. Incidentally, the control of these components is not absolutely required to be performed by software, but can also be performed by dedicated hardware (an electronic circuit).

The ECU 300 calculates a state of charge (an SOC) of the electrical storage device 110 on the basis of detection values of a voltage VB and a current IB from a voltage sensor (not shown) and a current sensor (not shown), which are installed in the electrical storage device 110.

The ECU 300 acquires an activation request signal ST for the drive unit 105 that is generated through the operation by the user. The ECU 300 activates the motor-generators 130 and 135 and the engine 140 on the basis of these pieces of information.

Figure 2:
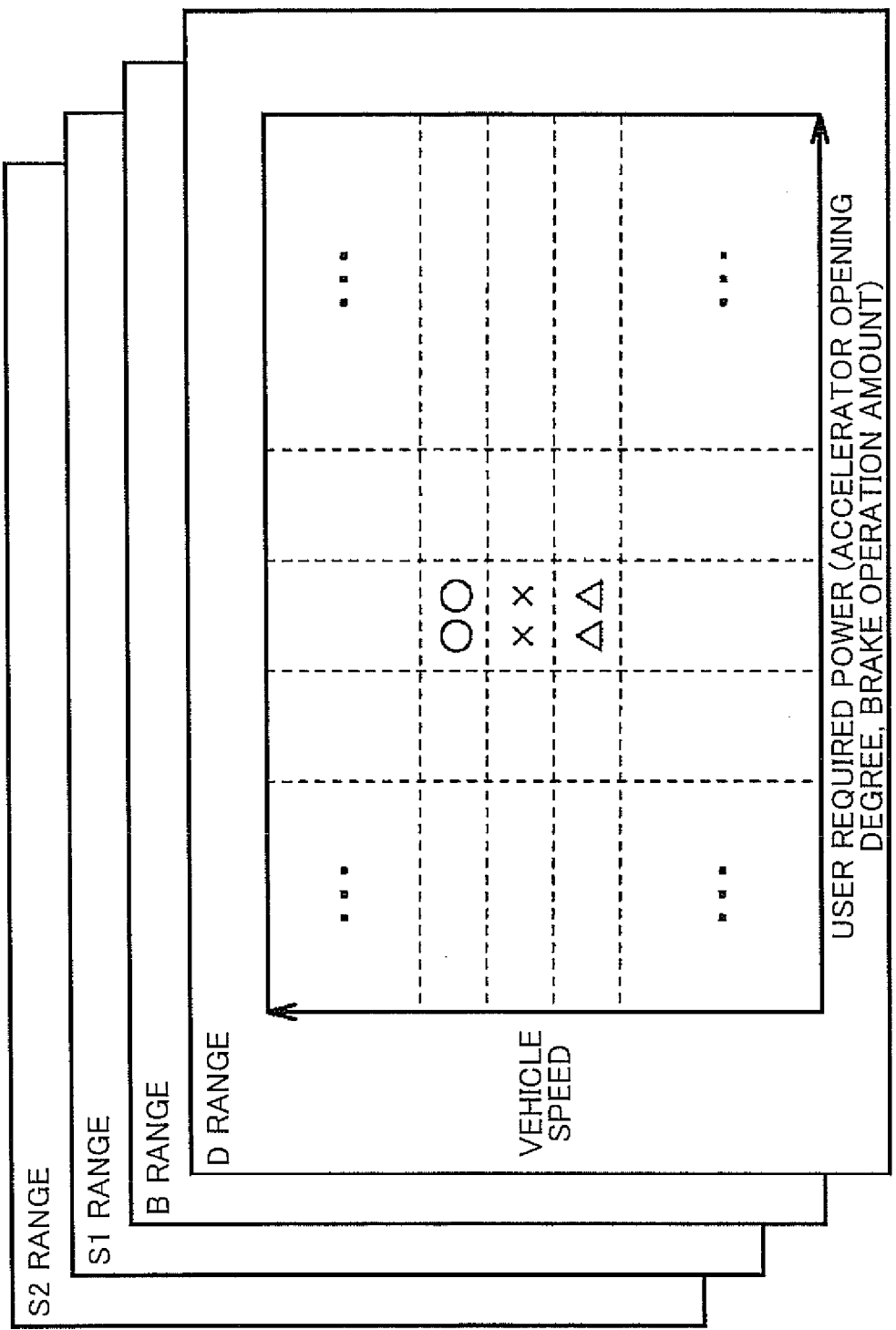
FIG. 2 is a diagram for illustrating a driving force (braking force) map that is determined in accordance with a shift range.

Besides, the ECU 300 has a driving force (braking force) map as shown in FIG. 2 for each shift range that is determined by a shift position SFT of the shift lever 190, and calculates a required driving force or a required braking force from a user required power, which is based on an accelerator opening degree ACC and an operation amount of a brake pedal (not shown), and a vehicle speed. Then, the ECU 300 controls the motor-generators 130 and 135 and the engine 140 in accordance with the calculated driving force or the calculated braking force. Incidentally, in a shift range in which a plurality of speed ratios are settable, a map as shown in FIG. 2 is provided for each of the speed ratios.

Incidentally, in the configuration shown in FIG. 1, a single control unit is provided as the ECU 300. However, for example, it is also appropriate to adopt a configuration in which control units such as a control unit for the PCU 120, a control unit for the electrical storage device 110 and the like are individually provided for respective functions or respective components to be controlled.

In such a vehicle, a stopped state of a vehicle system may be caused through erroneous operation of instruments for activating/stopping the vehicle system, such as an ignition key, a start switch and the like, by a user during the traveling of the vehicle.

In such a state, the drive unit may be stopped to establish a state where no driving force is output (a Ready-OFF state). For example, combustion in the engine is stopped, or a switching element of the inverter for driving the rotating electrical machine is stopped from being activated (shut down).

At this moment, a required driving force is not ensured. Therefore, the user may immediately reactivate the vehicle system and attempt to restore the vehicle system to a Ready-ON state.

Besides, in the hybrid vehicle having the motor-generators as shown in FIG. 1, if the Ready-OFF state is established to stop the drive unit, the generation of a braking force through regenerative braking is also stopped in addition to the stopping of the driving force.

Thus, if a vehicle system is reactivated, regenerative braking by the motor-generators is carried out to restore the braking force, with the accelerator unoperated.

Thus, in this embodiment of the invention, if the user reactivates the drive unit during the running of the vehicle and in the Ready-OFF state, activation control is performed to impose a greater limit on a braking force generated by the drive unit than at the time of normal running, until a predetermined requirement is fulfilled after the activation of the drive unit. Thus, the braking force can be prevented from fluctuating during the running of the vehicle and at the time of restoration from the Ready-OFF state.

Figure 3:
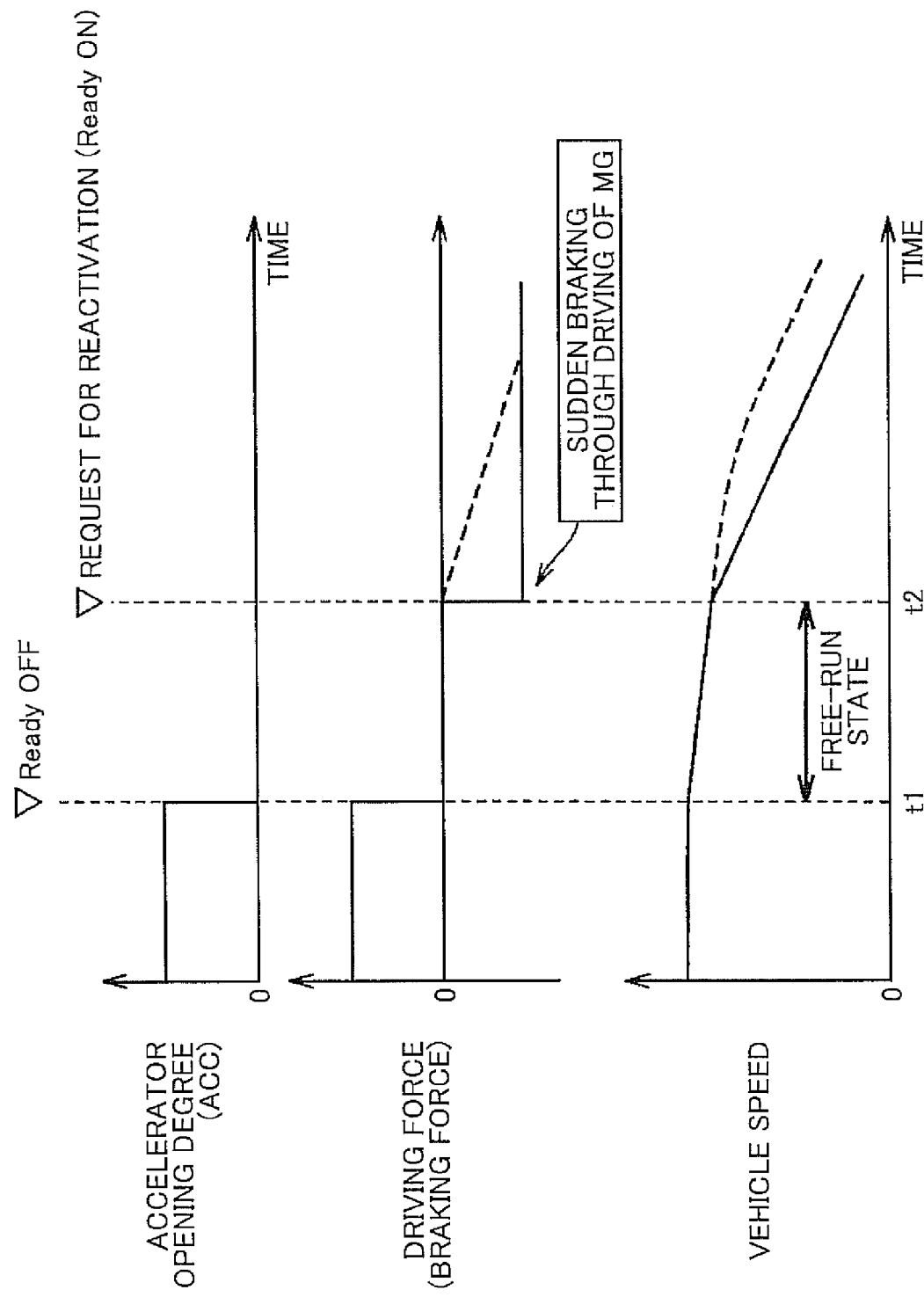
FIG. 3 is a time chart for illustrating the outline of activation control according to this embodiment of the invention.

FIG. 3 is a time chart for illustrating the outline of activation control according to this embodiment of the invention. In FIG. 3, the upper stage represents the accelerator opening degree ACC, the middle stage represents a driving force or braking force generated by the drive unit 105, and the lower stage represents a vehicle speed. Incidentally, it is assumed in FIG. 3 that the driving force generated by the drive unit 105 is expressed as a positive value, and that the braking force generated by the drive unit 105 is expressed as a negative value.

Referring to FIGS. 1 and 3, until a time t1, a driving force is output for the substantially constant accelerator opening degree ACC, the vehicle 100 is caused to run as usual at a constant vehicle speed.

If the Ready-OFF state is established during running through an erroneous operation by the user or the like at the time t1, the drive unit 105 is stopped, and the motor-generators assume a free-run state. Thus, neither a driving force nor a braking force is output, and the vehicle gradually decelerates with a gentle deceleration.

If the user performs reactivation operation at a time t2, the Ready-ON state is established to activate the drive unit 105, and as a result, regenerative operation by the motor-generators is started, in the case where the accelerator pedal 180 has not been operated. Thus, a braking force is generated to cause an increase in deceleration.

Thus, in this embodiment of the invention, if the user reactivates the drive unit during the running of the vehicle and in the Ready-OFF state, activation control is performed to impose a greater limit on the braking force generated by the drive unit than at the time of normal running, until a predetermined condition is fulfilled. Thus, as indicated by a broken line in FIG. 3, after the Ready-ON state is established, the braking force generated by the drive unit 105 can be gradually increased, and the deceleration can also be gently increased in a manner corresponding to the increase in the braking force. Thus, during the running of the vehicle and at the time of restoration from the Ready-OFF state, the braking force can be prevented from fluctuating.

Incidentally, at this time, in a shift range that allows a changeover to a plurality of speed ratios, a high speed-side speed ratio is selected on a priority basis such that the generated deceleration becomes gentle.

Figure 4:
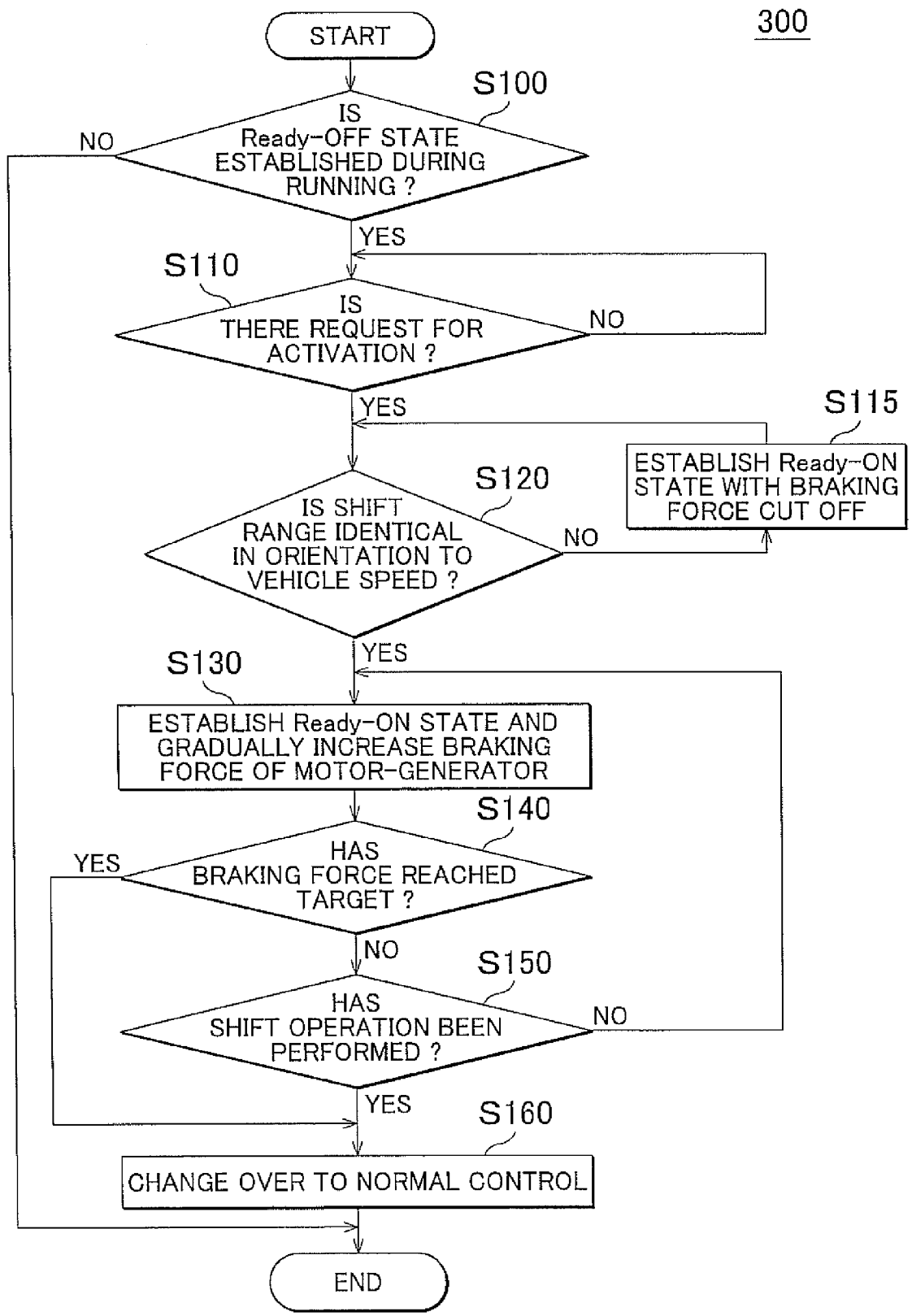
FIG. 4 is a flowchart for illustrating the details of an activation control processing that is performed by an ECU in this embodiment of the invention.

FIG. 4 is a flowchart for illustrating the details of an activation control processing that is performed by the ECU 300 in this embodiment of the invention. The processing of the flowchart shown in FIG. 4 is realized by calling a program stored in advance in the ECU 300 from a main routine and executing the program on a predetermined cycle. Alternatively, the process in one of the steps, or the processes in some or all the steps can also be realized by dedicated hardware (an electronic circuit).

Referring to FIGS. 1 and 4, the ECU 300 determines in step (which will be abbreviated hereinafter as S) 100 whether or not the vehicle 100 is in the Ready-OFF state during traveling, namely, whether or not the vehicle 100 coasts. More specifically, for example, if the vehicle speed is equal to or higher than a predetermined value with the motor-generators 130 and 135 and the engine 140 unactivated, it is determined that the vehicle 100 coasts.

If the vehicle 100 does not coast (NO in S100), the drive unit 105 has been activated, or the drive unit 105 has not been activated while the vehicle 100 is stopped. In this state, the activation of the drive unit 105 is unnecessary, or the drive unit 105 can be normally activated. Therefore, the ECU 300 skips the subsequent steps to end the process.

If the vehicle 100 coasts (YES in S100), the process is advanced to S110, and the ECU 300 determines whether or not an activation request has been received from the user.

If there is no activation request from the user (NO in S110), the process is returned to S100, and the ECU 300 awaits an activation request from the user. Incidentally, in the case where the user has stopped driving or the vehicle has been stopped for a certain length of period, there may not have been any activation request from the user for a long time. Hence, although not shown in FIG. 4, if there is no activation request from the user even after the lapse of a predetermined time that is set in advance, the process may be ended.

If an activation request from the user is made (YES in S110), the processing is advanced to S120, and the ECU 300 determines whether or not a shift range that is determined from the shift position SFT of the shift lever 190 is identical in orientation to the current direction of the vehicle speed. For Example, The ECU 300 determines whether or not the traveling direction of the vehicle in the shift range (i.e., forward or backward) is the same as the current traveling direction of the vehicle (i.e., forward or backward). More specifically, if the vehicle runs forward, it is determined whether or not the shift range is a B range, an S range or a D range as a running range. Besides, if the vehicle runs backward, it is determined whether or not the shift range is an R range as a reverse range.

If the shift range is not identical in orientation to the vehicle speed (NO in S120), the processing is advanced to S115, and the ECU 300 activates the drive unit 105 with no braking force output. More specifically, for example, the ECU 300 forcibly sets the braking force calculated from a map as shown in FIG. 2 to zero, and subjects the inverters 122 and 123 to zero torque control, or performs the control of shutting down the inverters 122 and 123. Alternatively, in the case of a vehicle having a transmission, the ECU 300 may perform control such that the transmission is in a neutral state, instead of or in addition to stopping the generation of the driving force of the inverters 122 and 123.

Then, the processing is returned to S120, and the ECU 300 continues to hold a state where the braking force is cut off, until the shift range becomes identical in orientation to the vehicle speed.

If the shift range is identical in orientation to the vehicle speed (YES in S120), the processing is advanced to S130, and the ECU 300 establishes the Ready-ON state and activates the drive unit 105, while limiting the braking force output from the drive unit 105. More specifically, the ECU 300 sets the braking force output from the drive unit 105 such that the braking force gradually increases from zero. Incidentally, if the Ready-ON state has already been established in step S115, the Ready-ON state continues to be held.

Besides, in a shift range that allows a changeover to a plurality of speed ratios, the ECU 300 selects a high speed-side one of the speed ratios on a priority basis. Incidentally, the ECU 300 may make a changeover from high speed-side speed ratios to low speed-side speed ratios step by step with the passage of time according to need.

Then, the ECU 300 determines in S140 whether or not the actual braking force has reached a target value of the braking force to be generated at the time of normal running.

If the actual braking force has reached the target value (YES in S140), the processing is advanced to S160, and the ECU 300 lifts the limit imposed on the braking force, and makes a changeover to normal control.

If the actual braking force has not reached the target value (NO in S140), the processing is advanced to S150, and the ECU 300 determines whether or not the user has operated the shift lever 190 to change the shift range.

If the shift operation has not been performed (NO in S150), the processing is returned to S130, and the ECU 300 continuously and gradually increases the braking force until the braking force reaches the target value.

If the shift operation has been performed (YES in S150), the ECU 300 determines that the user intends to change the braking force, advances the processing to S160, and lifts the limit imposed on the braking force to reflect the request made by the user.

In this case as well, however, if a large torque shock is generated, the degree of limit may be made gentler without completely lifting the limit imposed on the braking force.

By performing control in accordance with the foregoing processing, a greater limit is imposed on the generated braking force than at the time of normal running, if the operation of activating the drive unit is performed while the vehicle runs with the drive unit unactivated. Therefore, the braking force can be restrained from changing.

Figure 5:
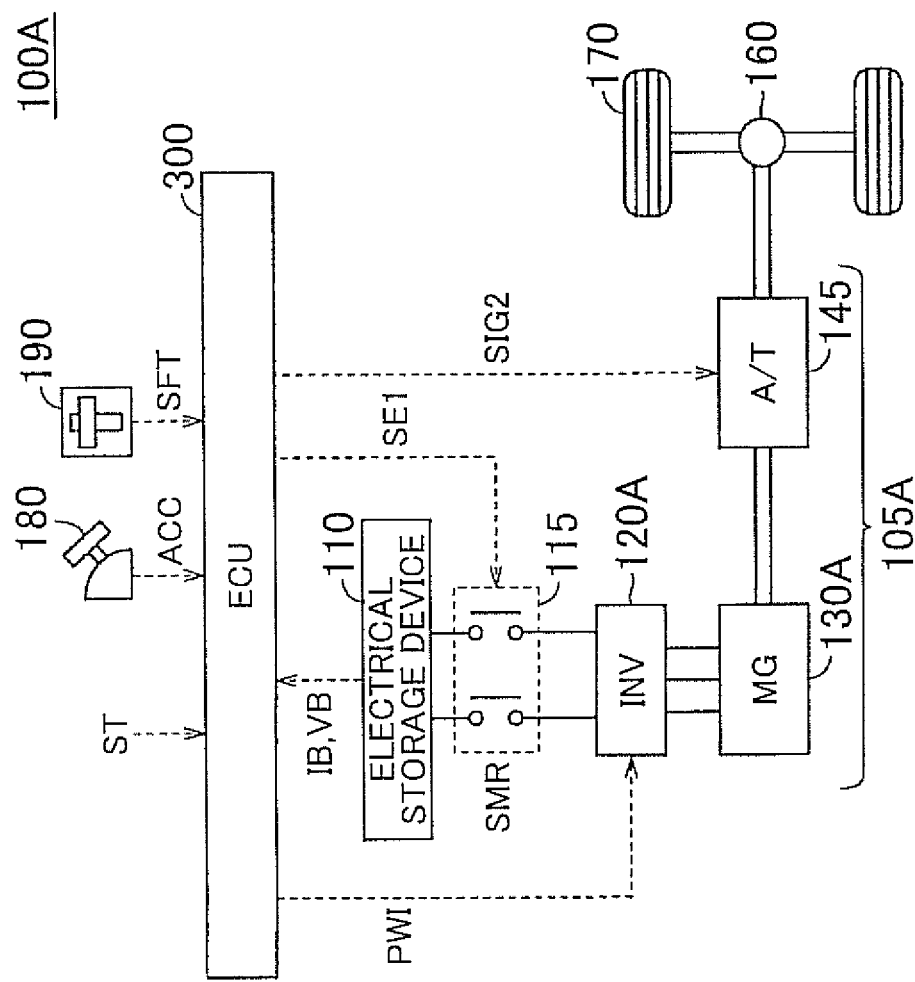
FIG. 5 is an overall block diagram of a first alternative vehicle according to this embodiment of the invention.
Figure 6:
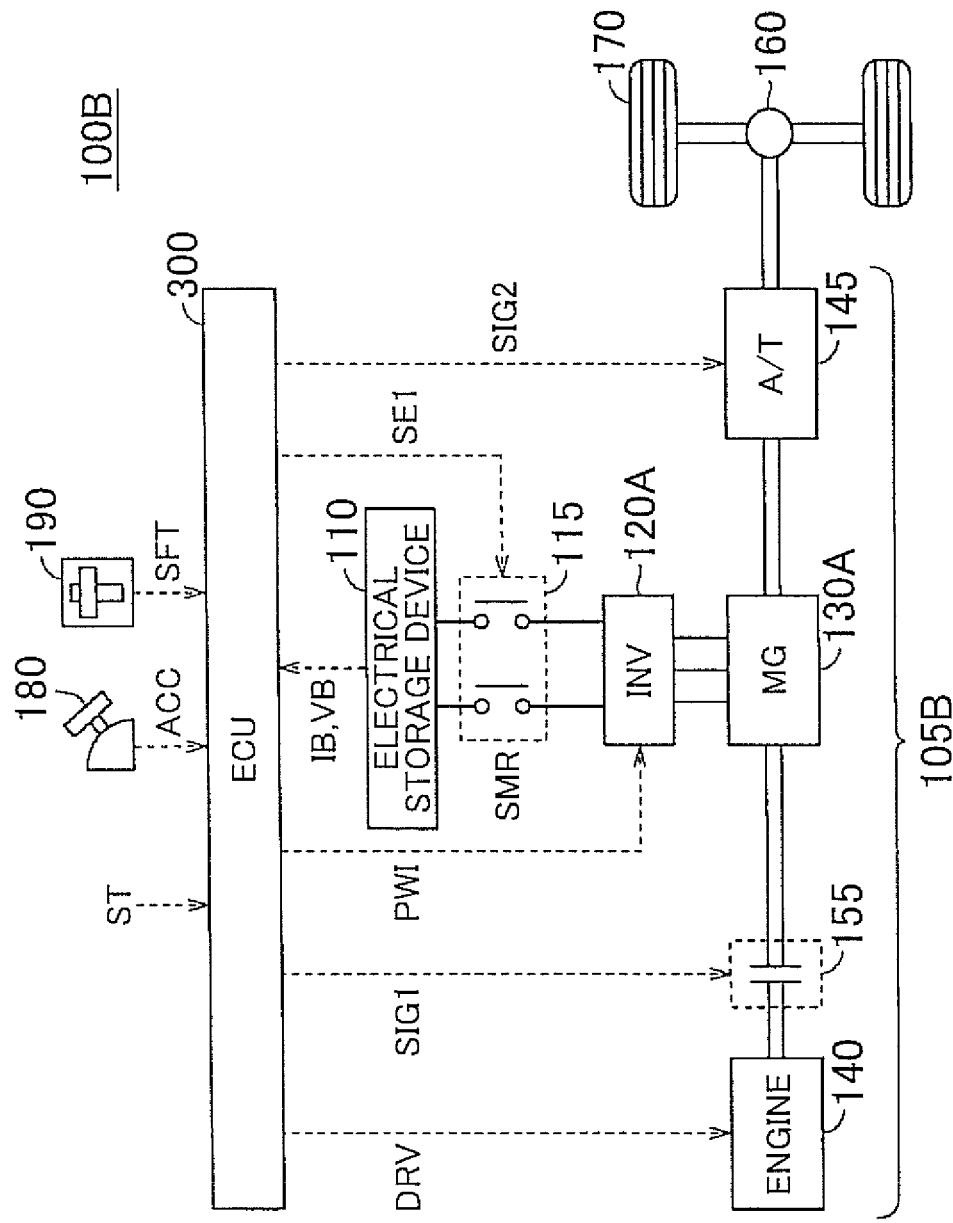
FIG. 6 is an overall block diagram of a second alternative vehicle according to this embodiment of the invention.

FIGS. 5 and 6 show other configurational examples of vehicles to which this embodiment of the invention can be applied. FIG. 5 shows an example of an electric vehicle 100A, and FIG. 6 shows an example of a hybrid vehicle 100B that is designed to employ a single motor-generator. Incidentally, in FIGS. 5 and 6, the description of the same component elements as in FIG. 1 will not be repeated.

In FIG. 5, a single motor-generator 130A and an automatic transmission (A/T) 145 are provided as a drive unit 105A.

The motor-generator 130A is driven by an inverter 120A. A driving force generated by the motor-generator 130A is transmitted to the driving wheels 170 via the automatic transmission 145. The automatic transmission 145 is controlled by a control signal SIG2 from the ECU 300.

In the vehicle thus configured, if the drive unit 105A is activated during coasting, the ECU 300 activates the drive unit 105A while limiting the braking force generated by the motor-generator 130A in the same manner as described above. Besides, at this time, if a shift range that allows a changeover to a plurality of speed ratios is set, the ECU 300 controls the automatic transmission 145 such that a high speed-side one of the speed ratios usable in the shift range, which makes the braking force smaller, is selected by priority.

In this manner, this embodiment of the invention can also be applied to the configuration like that of the vehicle 100A shown in FIG. 5. Besides, activation control according to this embodiment of the invention can also be applied in the same manner to a fuel-cell-powered vehicle that is mounted with a fuel cell that generates an electric power used for running and an electric power for charging an electrical storage device, as a configuration similar to that of FIG. 5.

Besides, in a hybrid vehicle 100B in FIG. 6, a drive unit 105B further includes the engine 140 and an engagement device 155 represented by a clutch, in addition to the configuration of FIG. 5.

The engagement device 155 is controlled by a control signal SIG1 from the ECU 300. Through engagement of the engagement device 155, a driving force from the engine 140 as well as a driving force from the motor-generator 130A is transmitted to the driving wheels 170. On the other hand, if the engagement device 155 is disengaged, only a driving force from the motor-generator 130A is transmitted to the driving wheels 170, as is the case with FIG. 5.

The aforementioned activation control can also be applied to this configuration. Incidentally, in FIG. 6, if the engagement device 155 is engaged, a braking force resulting from a frictional force of the engine 140 is also generated. Therefore, in imposing a limit on the braking force, the degree of engagement of the engagement device 155 may be adjusted in addition to or instead of adjusting the braking force of the motor-generator 130A.

Besides, although not shown in the drawings, the aforementioned activation control can also be applied to a conventional vehicle that employs only an engine as a drive source, by providing a mechanism capable of adjusting the driving force from the engine, such as the engagement device 155 shown in FIG. 6.

By applying activation control according to this embodiment of the invention to vehicles having different configurations as described above as well, the braking force can be restrained from changing in the case where the operation of activating a drive unit is performed during coasting, namely, while each of the vehicles runs with the drive unit unactivated.

The embodiment of the invention disclosed herein should be considered to be exemplary in all respects and not restrictive. The scope of the invention is not defined by the foregoing description but by the claims. The invention is intended to encompass all the alterations that are equivalent in significance and scope to the claims.

What is claimed is:

1. A vehicle comprising:
a drive unit configured to drive a driving wheel; and
a controller configured to control the drive unit and receive an activation command for the drive unit from a user, the controller limiting an actual braking force generated by the drive unit when a condition i) that the vehicle carries out coasting with the drive unit unactivated and a condition ii) that the activation command for the drive unit is received from the user are fulfilled, as compared to a case where the vehicle runs in a state other than coasting.

2. The vehicle according to claim 1, wherein
the controller gently increases the actual braking force if the controller has received the activation command during the coasting, as compared to a case where the vehicle runs in a state other than the coasting.

3. The vehicle according to claim 2, further comprising a gear shifter configured to be capable of changing a speed ratio between the drive unit and the driving wheel, wherein
the gear shifter selects one of a plurality of predetermined shift ranges on a basis of an operation by the user, and
the controller controls the drive unit such that no braking force is generated in a case where the selected shift range is different in orientation from a vehicle speed, if the controller has received the activation command during the coasting.

4. The vehicle according to claim 3, wherein
the controller lifts the limit on the actual braking force after the actual braking force has reached a braking force corresponding to a speed ratio formed by the gear shifter.

5. The vehicle according to claim 2, further comprising a gear shifter configured to be capable of changing a speed ratio between the drive unit and the driving wheel, wherein
the gear shifter selects one of a plurality of predetermined shift ranges on a basis of an operation by the user, and
the controller changes a degree of increase in the actual braking force in accordance with the selected shift range, if the controller has received the activation command during the coasting.

6. The vehicle according to claim 5, wherein
the controller sets, in a case where there are a plurality of speed ratios settable in the selected shift range, a speed ratio to one of the plurality of the settable speed ratios which makes the actual braking force small, if the controller has received the activation command during the coasting.

7. The vehicle according to claim 5, wherein
the controller lifts the limit on the actual braking force after the actual braking force has reached a braking force corresponding to a speed ratio formed by the gear shifter.

8. The vehicle according to claim 1, further comprising a gear shifter configured to be capable of changing a speed ratio between the drive unit and the driving wheel, wherein
the gear shifter selects one of a plurality of predetermined shift ranges on a basis of an operation by the user, and
the controller lifts the limit on the actual braking force if an operation of making a change in shift range is performed while the actual braking force is limited.

9. The vehicle according to claim 1, wherein
the drive unit includes at least one of an internal combustion engine and a rotating electrical machine.

10. A control method for a vehicle including a drive unit configured to drive a driving wheel, and a controller configured to control the drive unit and receive an activation command for the drive unit from a user, the control method comprising:
determining whether the vehicle carries out coasting with the drive unit unactivated;
determining whether the activation command has been received during the coasting; and
limiting an actual braking force generated by the drive unit if the controller has received the activation command during the coasting, as compared to a case where the vehicle runs in a state other than the coasting.

* * * * *